United States Patent

[11] 3,617,247

[72] Inventor James W. Chiles, Jr.
 P.O. Box 186, Clarksdale, Miss. 38614
[21] Appl. No. 667,085
[22] Filed Sept. 12, 1967
[45] Patented Nov. 2, 1971

[54] SEEDS AND TREATMENT THEREOF
 6 Claims, No Drawings
[52] U.S. Cl..................................................... 71/77,
  47/57.6
[51] Int. Cl....................................................... A01n 21/02
[50] Field of Search........................................... 47/57.6;
  71/77; 424/211; 260/943

[56] References Cited
UNITED STATES PATENTS

| | | | |
|---|---|---|---|
| 2,802,855 | 8/1957 | Whelstone.................... | 424/211 |
| 3,258,394 | 6/1966 | Hall et al. ..................... | 260/943 |
| 3,369,062 | 2/1968 | Ward, Jr........................ | 260/943 |

Primary Examiner—James O. Thomas, Jr.
Attorney—Jones & Lockwood

ABSTRACT: Treatment of seeds with materials which not only protect the seeds and seedlings from insect attack but which have been found to accelerate the growth of the seedling and increase the yield of harvestable crop.

SEEDS AND TREATMENT THEREOF

BACKGROUND OF THE INVENTION

This invention relates to treated seeds, to compositions useful therefore and to a method of treating seeds in order to protect same from insect infestation and increase the growth and yield thereof. In particular, this invention is directed to the treatment of agronomic seeds, particularly cottonseed, whereby such seeds are provided with a coating which penetrates the surface comprising carbamylalkenyl phosphorus-containing esters, especially the dimethyl phosphate of 3-hydroxy-N-methyl-cis-crotonamide.

In the past, seeds have been treated with various materials to protect same from the ravages of fungi and insects. Such treatments, however, due to the known phytotoxicity of many fungicides and most insecticides, generally result in only limited protection of the seed and the resulting seedling from insect and fungi infestation and also ultimately result in an at least partial reduction of the number of seedlings obtained from the planting. In other words, the number of seedlings resulting from the planting of a specified amount of fungicide or insecticide treated seeds is usually less than the number of seedlings resulting from untreated seeds planted in essentially fungus-free ground. The number of such seedlings in such instance is, however, appreciably greater than the number of seedlings resulting when untreated seeds are planted in ground containing fungi in significant quantities and in areas where deleterious inset pests are localized.

In some instances, seeds have been treated with insecticides and growth accelerators such as gibberellic acid in an attempt to protect the seed and, at the same time, increase the speed of germination and the rate of initial growth. Such treatments, however, also have a tendency to result in a smaller number of seedlings in comparison with the number of seedlings resulting from untreated seeds.

SUMMARY OF THE INVENTION

In view of the above considerations, the treatment of agronomic seeds with an insecticide which protects the seeds and seedlings from insects and which yet acts to accelerate the growth of the seedling and increase the amount of the ultimate crop harvested would be extremely beneficial to the agricultural industry.

Accordingly, it is an object of this invention to provide seed coated with carbamylalkenyl phosphorus-containing ester insecticides which act not only in their known insecticidal capacity but enhance the growth of seedlings and produce an increased ultimate yield of the crop planted.

A further object of the invention is the provision of a method for treating seeds with a carbamylalkenyl phosphorus-containing ester insecticide in order to render the seeds resistant to insect and/or other plant parasite infestation and to increase the yield of seedlings resulting therefrom.

The above objects, and other objects which will become apparent to those skilled in the art, are attained by the present nvention wherein seeds are treated with an insecticidal composition comprising carbamylalkenyl phosphorus-containing esters characterized by the formula:

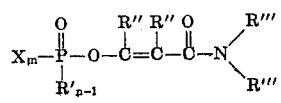

wherein X is a member of the class of radicals consisting of RO—, RNH—, and R₂N— in which R is an alkyl group containing up to six carbon atoms; R' is a monovalent hydrocarbon radical; each R" is a member of the class consisting of a hydrogen atom and an alkyl radical; each R''', taken singly, is a member of the class consisting of a hydrogen atom, a monovalent hydrocarbon radical, an alkoxyaryl radical, a cyanoaryl radical, and taken together in combination, a divalent hydrocarbon radical with four to five saturated carbon atoms in a chain between the two valences; $m$ is an integer of 1 to 2 and $n=3_{1m}$. Thus, for example, R is any alkyl radical of up to six carbon atoms such as methyl, ethyl, isopropyl, butyl, etc. R' is any monovalent hydrocarbon radical such as methyl, ethyl, isobutyl, 3-hexyl, decyl octadecyl, oleyl, propargyl, etc. Each R" is the same or different and is a hydrocarbon atom or a methyl, ethyl or isobutyl group. Taken singly, each R''' is the same or different and is a hydrogen atom or any monovalent hydrocarbon radical such as was exemplified for R'. Taken together, the R''''s are a divalent hydrocarbon radical with four to five saturated carbon atom in a chain between the two valences such as a tetramethylene radical, as in a pyrrolidyl group, or a pentamethylene radical, as in a piperidyl group, and homologues thereof. It will be noted from the above formula that when $m$ is the integer 1, $n-1=1$ and the compound is a phosphate; and that when $m$ is the integer 2, $n-1=0$ and the compound is a related phosphate. Preferably, the compounds have alkyl groups as the hydrocarbon radicals, and it is further preferred that the compounds be derivatives of N,N-dialkyl alpha-chloroaceto-acetamide.

DESCRIPTION OF THE PREFERRED EMBODIMENTS

Insectidical compositions having the above-described essential ingredient are more particularly disclosed in U.S. Pat. No. 2,802,855 to Richard R. Whetstone and Allen R. Stiles. As disclosed in that patent, the insecticidal compositions utilized in the present invention are prepared by reacting an appropriate phosphonite or phosphite with an α-chloro, β-oxo fatty acid amide. The complex aryl phosphonate insecticides utilized in accordance with the present invention are ordinarily liquids at ambient temperature and pressure. The compounds are of particular utility as insecticides since they are characterized by outstanding properties when employed as contact insecticides. The compounds are highly toxic to insects, i.e., members of the class Insecta and related to similar organisms belonging to related classes of Arthropods and including mites, ticks, spiders, wood lice, thrips and the like.

The insecticidal compound utilized for treating seeds in accordance with the present invention may be applied to the seeds by spraying or may be otherwise applied in the form of a solution, suspension or dispersion. Further, these solutions may be applied by brushing, dipping and the like and can be prepared in the form of solutions by utilizing well-known inset organic horticultural carriers including hydrocarbons, acetone and nonphytotoxic oils of intermediate viscosity and volatility. It is to be understood, of course, that adjuvants such as spreading or wetting agents can also be employed in the preparation of solutions or water suspension. Illustrative materials of this character include fatty acid soaps, long-chain fatty alcohols, alkyl aryl sulfonates, long-chain alkyl sulfonates and the like. These solutions can be employed as such for dipping purposes or may be dispersed or emulsified and applied to the seeds in the form of a spray. The insecticide composition penetrates the surface of the seed so that the exterior of the seeds is dry in appearance within about 30 minutes after treatment.

The concentration of the insecticidal compounds utilized as seed treating reagents is dependent upon many factors, including the particular compound utilized, the seed employed, the method and condition of application and the insect species to be controlled. Such considerations, however, are within the skill of those versed in horticultural-insecticidal art. In general, however, it is recommended that the compounds utilized in the treatment of seeds in accordance with the present invention be applied in concentrations of from about 0.01 to 2 percent based upon the total weight of the seed treated although as little as about 0.001 percent or as much as 5 percent or more of the compound may be employed with good results. A preferred concentration is from about 0.1 to about 5 pounds of the described insecticide per 100 pounds of seed and, more particularly, a concentration in the range of from 0.4 pound to 1 pound of carbamylalkenyl phosphorous ester per 100 pounds of seed.

The compounds utilized in the method of this invention can be employed either as the sole toxic ingredient of the insecticidal composition or it may be employed in conjunction with other insecticidal or fungicidal materials.

Although the most outstanding results, with regard to the unexpected combination of insecticidal and yield increasing properties, has been demonstrated on cottonseed, it is not intended that the invention be restricted thereto. For instance, the treating method of this invention may be applied to seeds of such a nature as rice, corn, soybeans, southern peas, wheat, oats, potatoes, etc.

The following illustrative examples of certain preferred embodiment of the invention will serve to more fully illustrate the full scope of the invention and it is understood that the invention is not to be limited thereby. The following examples will illustrate the unexpected combination of insect regulation and increased yield by the treatment of cottonseeds with the insecticidal compositions described hereinabove. Comparative data is shown with regard to seeds treated with other known insecticides and with regard to untreated seeds.

EXAMPLE 1

Side-by-side plots were planted with cottonseed which had been (1) coated with a carbamylalkenyl phosphorus-containing ester, the dimethyl phosphate of 3-hydroxy-N-methyl-cis-crotonamide, (2) coated with "Bidrin" (an insecticide containing as the active ingredient 3-(dimethoxyphosphinyloxy)-N,N-dimethyl-cis-crotonamide) and (3) a control of untreated cottonseed. The cottonseeds were sprayed in a concrete mixer at a rate calculated to apply 0.8 pounds of Bidron per 100 pounds of seed and the same concentration of the dimethyl phosphate of 3-hydroxy-N-methyl-cis-croton-amide. The planting rate was 22 pounds of seed per acre, so that the effective rate per acre of applied chemical was 0.176 pounds per acre of seeds planted. Insect control was outstanding. Table 1 illustrates the unexpectedly increased yield of the cottonseed treated with the insecticidal compositions utilized in the present invention.

Table 1

| Coating | Yield, Pounds Per Acre |
| --- | --- |
| (A) Untreated cottonseed (Control No. 1) | 792 |
| "Bidrin" treated cottonseed | 891 |
| (B) Untreated cottonseed (Control No. 2) | 594 |
| Dimethyl phosphate of 3-hydroxy-N-methyl-cis-crotonamide | 1,320 |

It is apparent from the above data that in addition to the normal insect-controlling properties of the insecticidal compositions utilized in the present invention, there were obtained yield increased of approximately 67 percent, approximately 48 percent and approximately 122 percent, respectively, of the yields produced in accordance with Control No. 1, Bidrin and Control No. 2.

Further, it is seen that (A) seeds treated with Bidrin resulted in an increase in yield of about 11 percent but that (B) seeds treated with the insecticide utilized in the present invention resulted in an increase of yield of about 122 percent. Such an increase is totally unexpected.

EXAMPLE 2

In a test for thrip control on seedling cotton, delinted Carolina Queen cottonseed was treated with the dimethyl phosphate of 3-hydroxy-N-methyl-cis-crotonamide at the rate of 0.4 pounds of the insecticide per 100 pounds of cottonseed. 14 pounds of the treated seed per acre were hill-dropped at a rate calculated at 0.06 pounds of insecticide per acre. During the period of growth thrips were severe but there were no thrips or thrip damage on the cotton plants grown from the insecticide treated seeds. The treated seeds produced vigorous seedlings which fruited earlier than comparable untreated cotton. The big leaves and cleaned buds indicated healthy plant conditions. Table 2, below, illustrates the yield in pounds per acre of cotton obtained from untreated cottonseed and from cottonseed treated in accordance with the invention at a rate calculated to achieve 0.06 pounds of insecticide per acre.

Table 2

| Control | (untreated cottonseed) | 656 pounds per acre |
| --- | --- | --- |
|  | (treated cottonseed) | 934 pounds per acre |

The above data illustrates that the treated seed produced a yield approximately 42 percent greater than the yield obtained from untreated cottonseed.

EXAMPLE 3

This example illustrates an experiment of treating cottonseed before planting for the control of aphids, thrips, and other sucking insects on the seedling cotton. Mechanically delinted Stoneville 213 cottonseed was mixed with a dispersion of 1.06 pounds of the dimethyl phosphate of 3-hydroxy-N-methyl-cis-crotonamide per 100 pounds of cottonseed and planted at the rate of 23 pounds of seed per acre. The insecticide dosage was 0.25 pounds per acre. The seed treatment was compared with a control which was treated with a standard herbicide (a suspension containing Diuron, a substituted urea type herbicide) at a rate of 0.2 pounds per acre. No adverse effect on the plants was noticed as a result of the seed treatments. The seed treated in accordance with the invention exhibited excellent control for thrips and plant growth respond was excellent. Although spider mites had created problems in the treated fields in previous years, such problems in the treated fields in previous years, such problems did not occur in the field sown with the cottonseed treated with the insecticide utilized in the invention. Table 3, below, illustrates the yield of cotton obtained in pounds per acre with the herbicide-treated control and the seed treated with insecticides of the invention.

Table 3

| Control | 795 |
| --- | --- |
| Treated seed | 1,028 |

The above data illustrates that the cottonseed treated in accordance with the invention resulted in an increased yield of approximately 42 percent over the seed treated only with the above-described herbicide.

EXAMPLE 4

Acid delinted Stonevill 213 cottonseed was treated with 0.8 pounds of the dimethyl phosphate of 3-hydroxy-N-methyl-cis-crotonamide per 100 pounds of cottonseed. The seed was planted the same day and the rate of insecticide per acre of treated seed was 0.1 pound per acre.

The yield from the above planting was compared with a planting of the same seed treated in a conventional manner by injection of an equivalent amount of Di-Syston the trade name a compound of the chemical name, O,O-diethyl,-S-2-(ethylthio)ethyl phosphorodithioate which is an insecticide, miticide and/or fungicide as will appear from Lorenz et al. U.S. Pat. No. 2,759,010, and Farbenfabriken Bayer French Pat. No. 1,421,510, patented Nov. 8, 1965, to which Hans Scheinplug et al. U.S. Pat. No. 3,459,857, corresponds, and a liquid fertilizer three inches on either side of the drill roll.

The yields of the above plantings were compared with an untreated control planting. The results are summarized in table 4, below.

Table 4

| Planting | Yield, Pounds Per Acre |
| --- | --- |
| Control | 624 |
| Di-Syston/Fertilizer Treatment | 705 |
| Dimethyl phosphate of 3-hydroxy-N-methyl-cis-crotonamide | 875 |

The data of table 4 illustrates that the seeds treated in accordance with the invention produced a yield increase of about 29 percent over the control and about 20 percent over the comparative insecticide/fertilizer treatment.

Further, the insecticides utilized in accordance with the invention provided superior thrips control.

The invention has been described in considerable detail with respect to certain preferred embodiments thereof but it is understood that variations and modifications are possible in the light of the disclosure and the appended claims.

I claim:

1. The method for increasing the yield of seedlings emerging from seeds in soil and stimulating the growth of said seedlings which comprises contacting said seeds with a growth-enhancing amount of a compound comprising a carbamylalkenyl phosphorous ester.

2. A method as defined in claim 1 wherein said seeds are cottonseeds.

3. A method as defined in claim 2 wherein said phosphate is added in an amount ranging from about 0.4 pounds to about 1 pound per 100 pounds of cottonseed.

4. The method for increasing the yield of seedlings emerging from seeds in soil and stimulating the growth of said seedlings which comprise contacting said seeds with a growth-enhancing amount of dimethyl phosphate of 3-hydroxy-N-methyl-cis-crotonamide.

5. A method as defined in claim 4 wherein said seeds are cottonseeds.

6. A method as defined in claim 5 wherein said phosphate is added in an amount ranging from about 0.4 pounds to about 1 pound per 100 pounds of cottonseed.

* * * * *